United States Patent [19]

Armstrong et al.

[11] 4,088,177
[45] May 9, 1978

[54] PERMANENT MAGNET D.C. DYNAMOELECTRIC MACHINE AND METHOD OF MAKING SAME

[75] Inventors: Frederick J. Armstrong; Robert A. Susdorf, both of Fort Wayne, Ind.

[73] Assignee: General Electric Company, Fort Wayne, Ind.

[21] Appl. No.: 647,136

[22] Filed: Jan. 7, 1976

[51] Int. Cl.$^2$ .............................................. B22D 19/00
[52] U.S. Cl. ...................................... 164/109; 164/63; 310/42; 164/333
[58] Field of Search ................. 164/63, 108, 109, 110; 310/42, 154; 29/596

[56] References Cited

U.S. PATENT DOCUMENTS

| | | | |
|---|---|---|---|
| 2,048,161 | 7/1936 | Klaiber | 171/252 |
| 2,488,458 | 11/1949 | Walton et al. | 171/252 |
| 2,711,492 | 6/1955 | Ballman | 310/254 |
| 2,810,847 | 10/1957 | Tweedy | 310/254 |
| 2,903,610 | 9/1959 | Bessiere | 310/254 |
| 2,991,518 | 7/1961 | Schaefer | 164/63 |
| 3,368,275 | 2/1968 | Eberline et al. | 29/598 |
| 3,465,186 | 9/1969 | Susdorf et al. | 310/158 |
| 3,488,836 | 1/1970 | Wheeler | 310/42 |
| 3,492,520 | 1/1970 | Yates | 310/261 |
| 3,523,570 | 8/1970 | Groteke | 164/338 X |
| 3,553,509 | 1/1971 | Schellekens | 310/154 |
| 3,562,568 | 2/1971 | Susdorf | 310/154 |
| 3,590,293 | 6/1971 | Susdorf | 310/154 |
| 3,671,787 | 6/1972 | Herron | 310/154 |
| 3,772,546 | 11/1973 | Means | 310/154 |
| 3,862,656 | 1/1975 | Weiler et al. | 164/63 |

FOREIGN PATENT DOCUMENTS 759,960 10/1956 United Kingdom.

Primary Examiner—Francis S. Husar
Assistant Examiner—Kuang Y. Lin
Attorney, Agent, or Firm—Ralph E. Krisher, Jr.

[57] ABSTRACT

A preferred process includes arranging field yoke segments, pole face segments, and one or more pieces of ceramic magnet material so that the yoke segments and pole face segments can be relied upon to establish low reluctance paths for magnetic flux associated with the ceramic magnet material. The process includes holding the ceramic magnet material sandwiched between the yoke pieces and pole pieces within a cavity of a casting fixture; admitting a molten metallic material to the cavity and adjacent to the yoke, pole, and ceramic material pieces; permitting the molten material to solidify; and thereafter removing the field assembly from the cavity with the ceramic pieces completely surrounded and encased by the pole pieces, yoke pieces, and solidified material. In a more preferred form, molten aluminum at a temperature of at least about 660° C is used as the molten metallic material even though the resulting thermal shock causes a fracturing or shattering of the ceramic material. In this form, the process includes fracturing the ceramic material because of the thermal shock caused by exposing it to the molten aluminum. After solidifying, the solidified material, along with the yoke and pole pieces, holds the ceramic material fragments together so that the fragmented ceramic material may be used as a permanent magnet portion of the field assembly.

15 Claims, 30 Drawing Figures

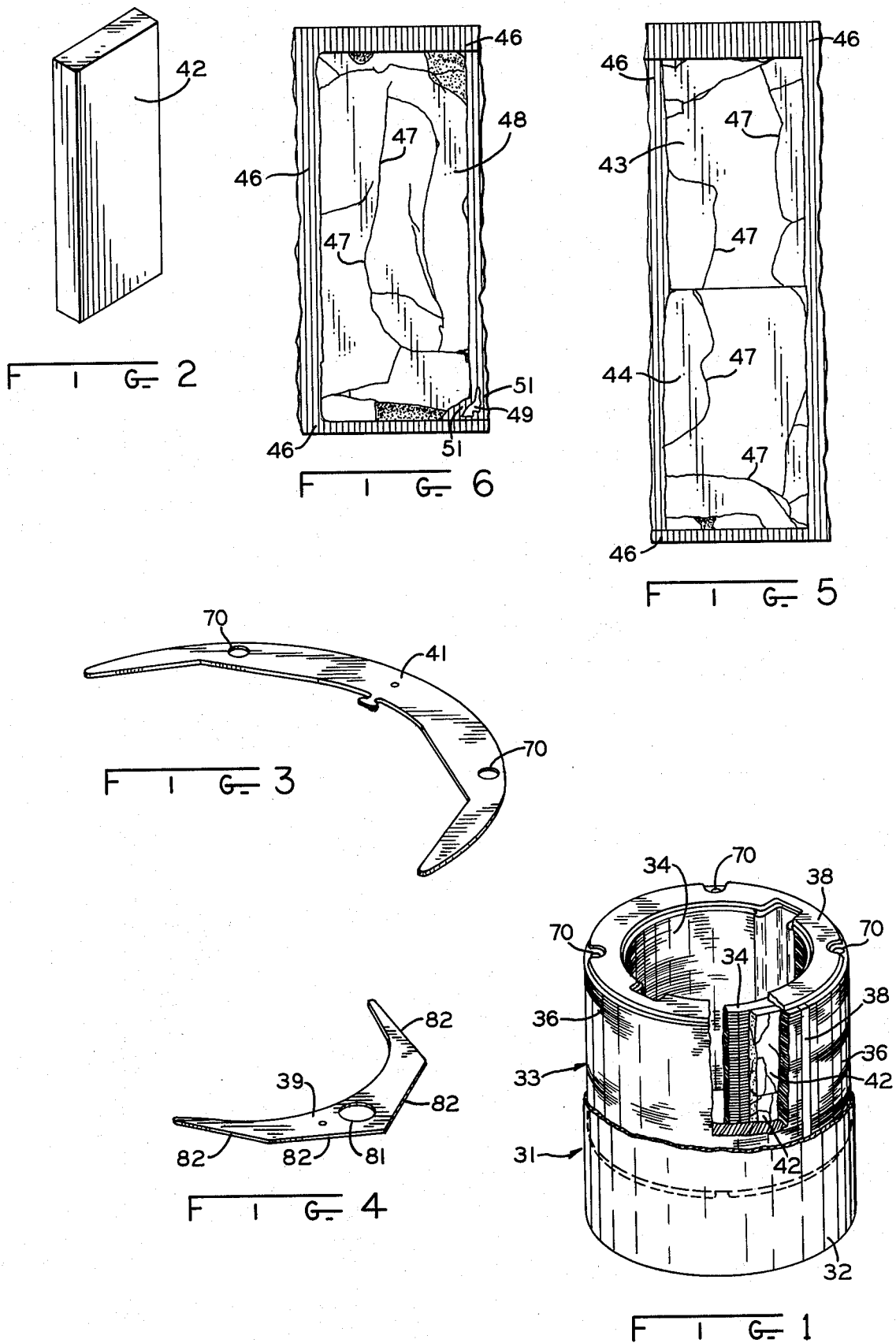

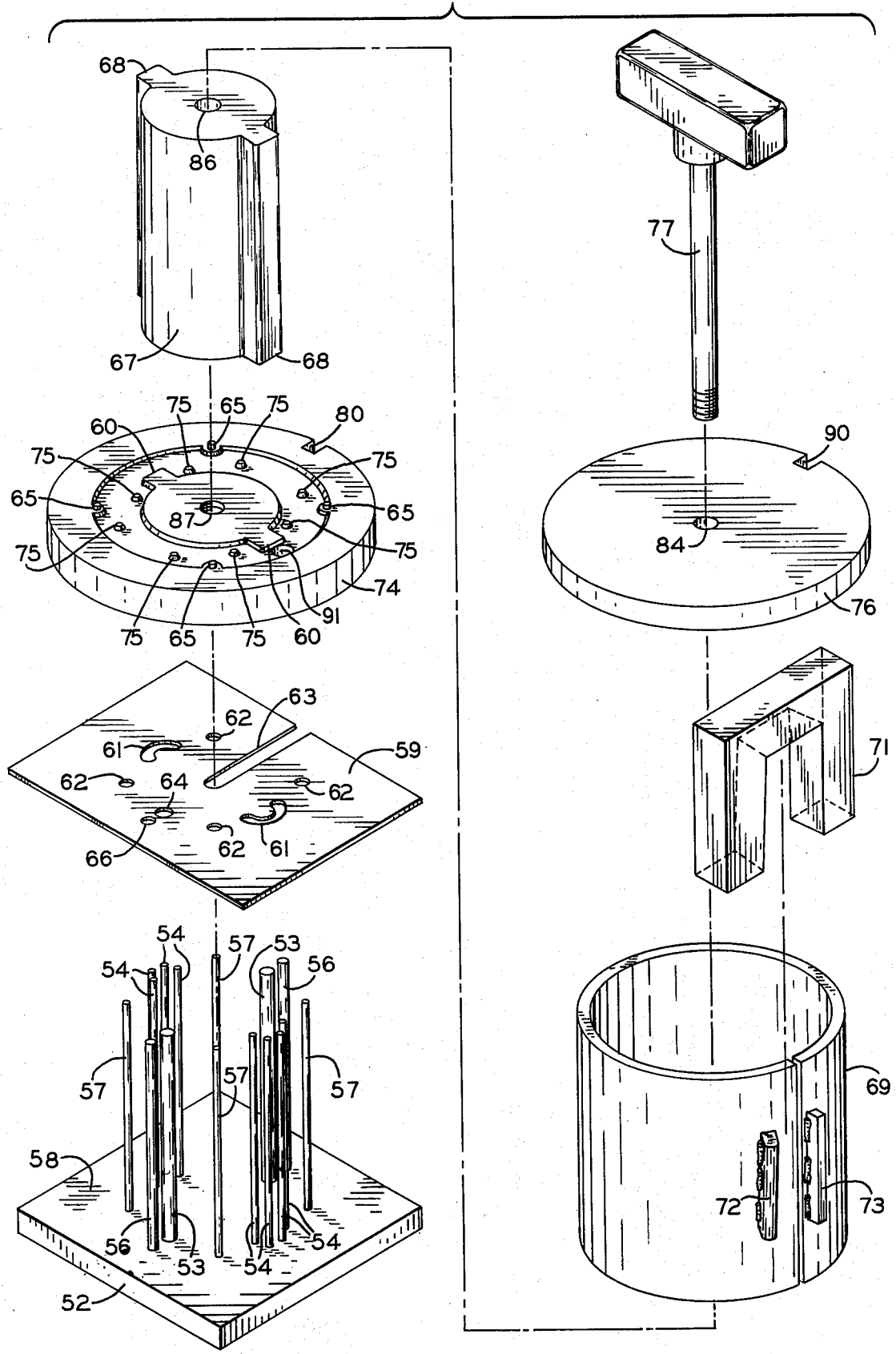

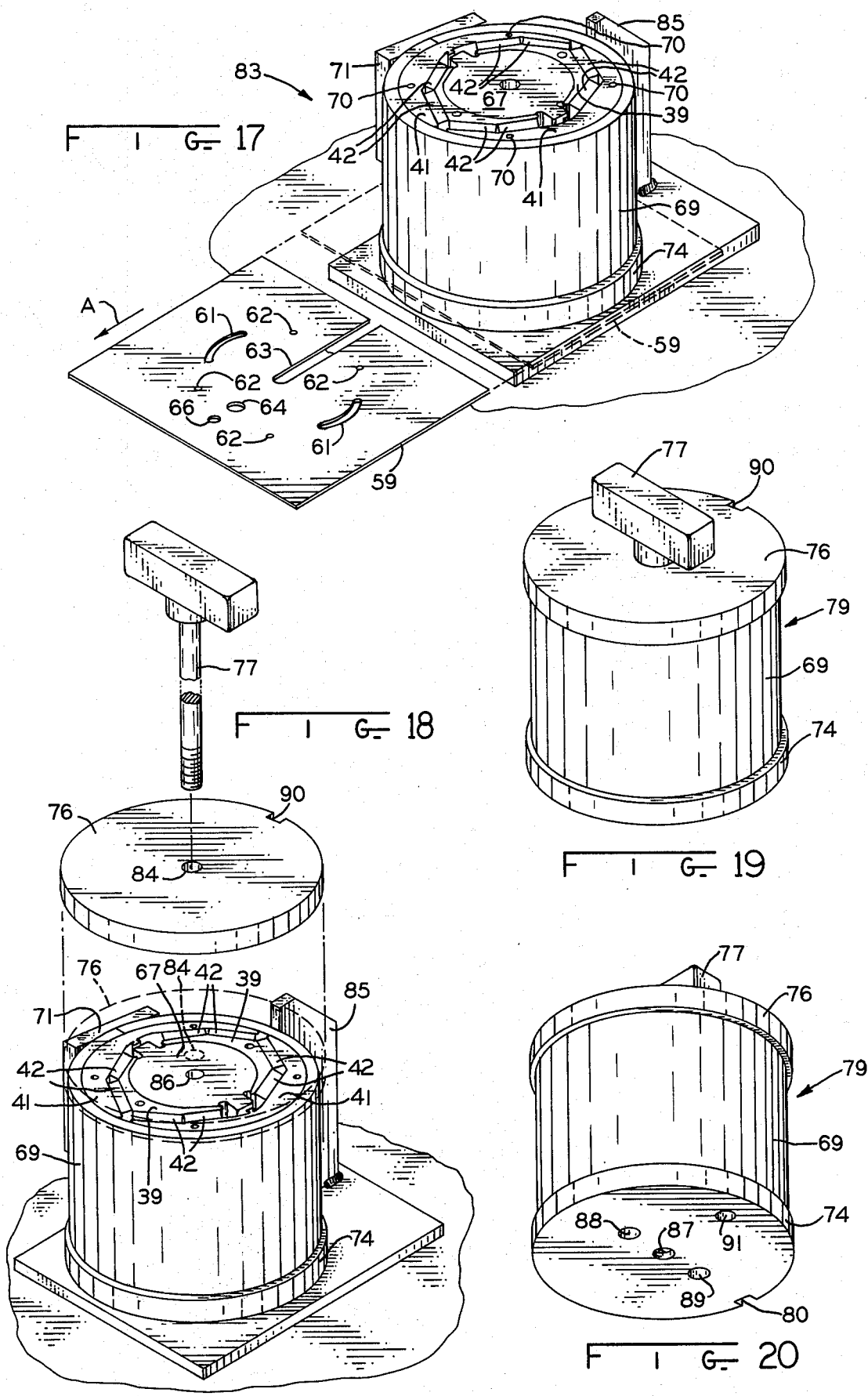

PERMANENT MAGNET D.C. DYNAMOELECTRIC MACHINE AND METHOD OF MAKING SAME

BACKGROUND OF THE INVENTION

The present invention relates generally to methods of manufacturing field assemblies for permanent magnet direct current dynamoelectric machines, and to products manufactured by such methods.

Generally speaking, d-c dynamoelectric machines (e.g., motors, and generators or alternators) may be classified as a wound field type or a permanent magnet field type. The permanent magnet type in turn may be further categorized as being of a type that utilizes magnets formed of alloy metals (such as an ALNICO alloy of the General Electric Company); or of a type that utilizes ceramic magnets, these also being called ferromagnetic ceramic or ferrite magnets.

At one time ALNICO magnets were used almost universally in d-c rotating machinery; but ceramic materials are now being applied in more and more cases. In the case of permanent magnet direct current motors, one of the reasons for using ceramic rather than ALNICO magnet materials is that ceramic magnets generally exhibit greater resistance to demagnetization and cost less.

In some prior permanent magnet motor designs, the pole faces of ceramic magnets have established one side of the working air gap. With such an approach, different techniques may be utilized to hold the magnets in place relative to the air gap. For example, the magnets may be trapped within preformed slots established by a number of aluminum lamina that together establish a cage-like structure (for example, see Herron Pat. No. 3,671,787).

In other applications, permanent magnets may be adhesively secured to other parts of the field structure (for example, see Susdorf et al U.S. Pat. No. 3,562,568 and Means U.S. Pat. No. 3,772,546); or molten materials such as aluminum may be poured around portions of such magnets so as to partially entrap them (for example, see Eberline et al U.S. Pat. No. 3,368,275).

Unfortunately, motors made pursuant to the above mentioned approaches often are not sufficiently rugged to withstand shock loads or other mechanical and thermal stresses without sustaining damage to one or more magnetics which in turn may cause motor failure.

To be more specific, many ceramic permanent magnet motors use arch or arc-like magnet segments as shown for example in the above mentioned Means patent. As pointed out by Means, the ceramic magnet materials are relatively fragile and brittle and may crack or break due to thermally or mechanically induced stresses. In addition to failure in this mode, ceramic magnets may "delaminate"; i.e., tend to peel apart in layers. It will be understood that breaking, chipping, or peeling of parts of the magnets results in loss of the very material that is relied upon for the magnetic field, and thus motor performance will deteriorate as portions of the magnets break or peel away. Of course, catastrophic failure can also result if magnetic material of sufficient quantity should become lodged in the working air gap.

SUMMARY OF THE INVENTION

Accordingly, it is a general object of the present invention to provide new and improved methods of manufacturing permanent magnet structures that include ceramic magnet materials and that are configured so that structural failures of ceramic magnets therein do not adversely affect continued and satisfactory operation of motors utilizing such structures.

It is another object of the present invention to provide a new and improved dynamoelectric machine magnetic structure whose satisfactory operation is not dependent on maintenance of the structural and dimensional integrity of ceramic magnet members.

It is a more particular object of the present invention to provide new and improved permanent magnet motor field structures that are products resulting from the practice of our new and improved processes.

In carrying out the above and other objects of our invention in one form, we relatively arrange field yoke segments, pole face segments, and one or more pieces of ceramic magnet material so that the yoke segments and pole face segments can be relied upon to establish low reluctance paths for magnetic flux associated with the ceramic magnet material when our process has been practiced and the product resulting therefrom is utilized as a permanent magnet d-c motor stator.

One preferred process includes holding the ceramic magnet material sandwiched between the yoke pieces and pole pieces within a cavity of a casting fixture; admitting a molten metallic material to the cavity and adjacent to the yoke, pole, and ceramic material pieces; permitting the molten material to solidify; and thereafter removing the field assembly from the cavity with the ceramic pieces completely surrounded and encased by the pole pieces, yoke pieces, and solidified material.

In a more preferred form, molten aluminum at a temperature of at least about 660° C is used as the molten metallic material even though the resulting thermal shock causes a fracturing or shattering of the ceramic material. After solidifying, the solidified material (along with the yoke and pole pieces) holds the ceramic material fragments together so that the fragmented ceramic material may be used as a permanent magnet portion of the field assembly.

The subject matter which we regard as our invention is set forth in the claims appended hereto. The invention itself, however, together with further objects and advantages thereof may be better understood by referring to the following more detailed description taken in conjunction with the drawings.

BRIEF DESCRIPTION OF THE DRAWINGS

FIG. 1 is a perspective view, with parts removed and parts broken away, of a new and novel stator that is a product of one process that embodies the invention in one preferred form;

FIG. 2 is a perspective view of a block of magnetizable ceramic material, a plurality of which are used when making the structure of FIG. 1;

FIG. 3 is a perspective view of a yoke segment lamination, a plurality of which are included in the assembly shown in FIG. 1;

FIG. 4 is a perspective view of a pole face lamination, a plurality of which are included in the structure of FIG. 1;

FIG. 5 is an elevational view, with parts removed and parts broken away, of a portion of the assembly shown in FIG. 1, this view better illustrating the shattered appearance of two ceramic blocks contained therewithin;

FIG. 6 corresponds to FIG. 5 except that the parts illustrated in FIG. 6 were taken from a stator assembly other than the one shown in FIG. 1;

FIG. 7 is an exploded perspective view of a number of separate fixture parts that may be utilized when practicing the invention in one specific form;

FIGS. 9–15, 17, and 18 illustrate, sequentially, steps that may be followed in the practice of the invention; these including outlines of various ones of the parts shown in FIG. 7;

FIG. 19 is a perspective view of an assembled molding fixture;

FIG. 20 is another perspective view of the structure shown in FIG. 19;

DESCRIPTION OF THE PREFERRED EMBODIMENTS

Figure 8:
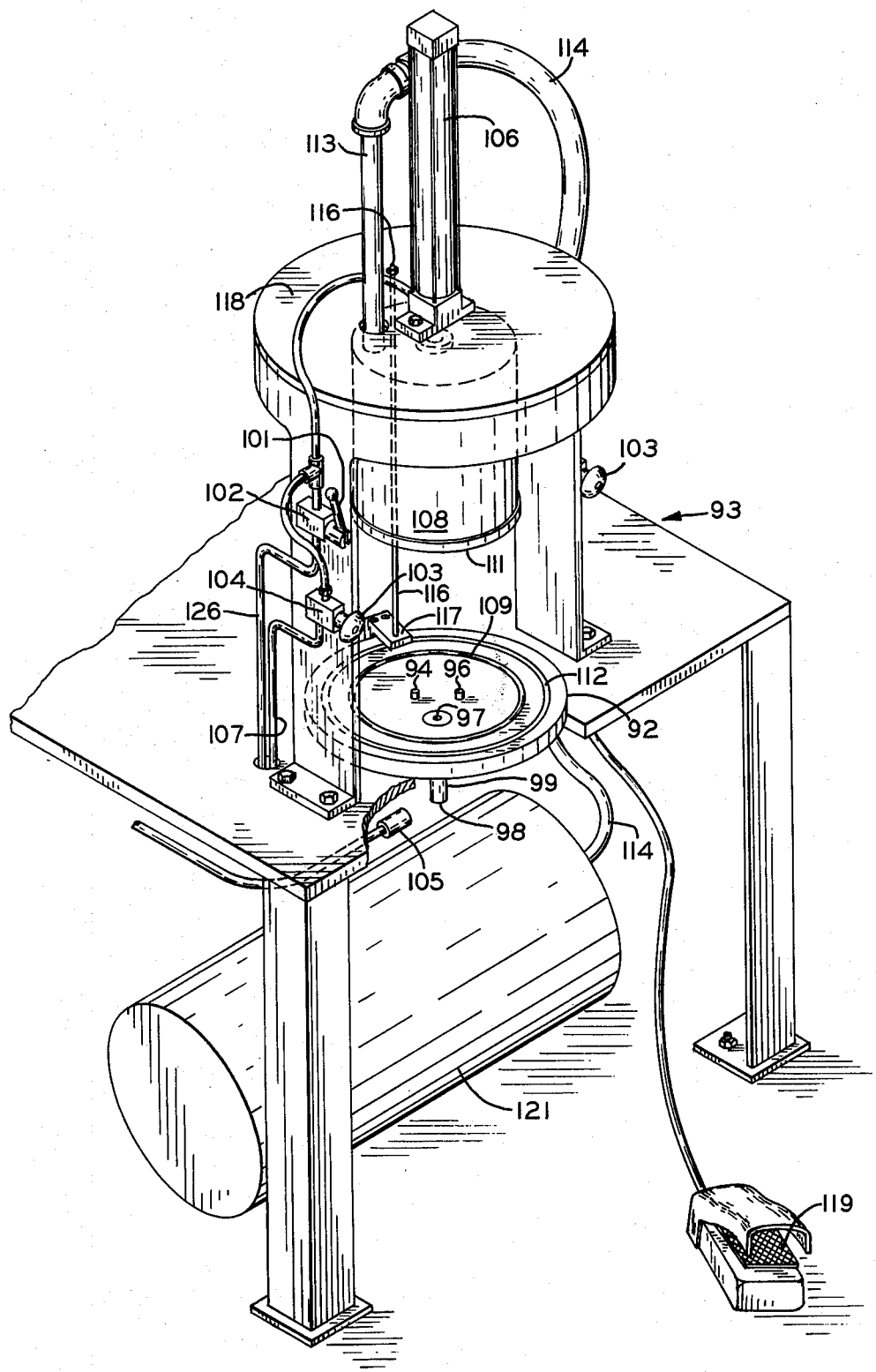
FIG. 8 is a perspective view of apparatus that may be utilized in conjunction with and during the practice of the invention.

In FIG. 1 we have shown a stator assembly 31 for a permanent magnet direct current motor. The stator assembly 31 includes a steel shell or housing 32 into which is press fitted a field assembly 33 comprised of pole pieces 34, yoke pieces 36, magnetizable ceramic blocks 42 and a solidified metal matrix 38 that has been cast against the pole pieces, yoke pieces, and ceramic blocks. Although the yoke pieces and pole faces may be machined from solid masses of soft steel or iron, it is more convenient to form the pole pieces from a plurality of pole face laminations 39 as shown, for example, in FIG. 4. Similarly, the yoke pieces of the field assembly 33 may conveniently be made up of a plurality of yoke segment laminations 41 as best illustrated in FIG. 3. The field assembly of FIG. 1 includes a total of 16 ceramic bars or blocks such as the permanently magnetizable ceramic block 42 that has been shown in FIG. 2.

Although a two pole field assembly is shown and described herein, it will be understood that the present invention may just as conveniently be used in the production of field assemblies having four or more poles.

With continued reference to FIG. 1, a solidified mass of aluminum surrounds and intimately engages the pole face laminations, yoke laminations, and ceramic blocks. This mass holds the entire field assembly structure together and prevents loss or mislocation of pieces of ceramic material even when the ceramic material is subjected to intense thermal or mechanical shock.

Although it is not readily apparent in FIG. 1, the ceramic blocks 42 probably would not remain positioned as shown if the field structure were in fact to be broken away in the manner suggested by FIG. 1. More likely, the ceramic material would appear as a number of small fragments and pieces incapable of remaining in place after removal of the yoke laminations and aluminum matrix material.

FIG. 5 is a view that illustrates the fractured or shattered condition of two ceramic blocks 43 and 44 within a field assembly such as that of FIG. 1. FIG. 5 has been drawn as accurately as possible to represent an actual physical specimen which was produced by practicing our invention and then carefully peeling yoke segment laminations away from the field assembly. It will be noted that the shattered ceramic blocks 43 and 44 remained entrapped within the confines of the cast aluminum matrix 46 even though a number of cracks 47 were evident along the surfaces thereof.

The structure depicted in FIG. 6 is based on another specimen that was taken from a field assembly having a somewhat shorter axial length or height than the assembly illustrated in FIG. 1. In fact, the axial length of the fractured ceramic block 48 of FIG. 6 had a length of about 7.6 centimeters; whereas the blocks 43 and 44 of FIG. 5 each had a length of about 5 centimeters each (so the total bar length was approximately 10 centimeters).

It is interesting to note the lower right hand corner of bar 48 in FIG. 6 where a portion 49 of ceramic material is surrounded by a web 51 of aluminum matrix material. It is believed that, during an aluminum casting process as described hereinbelow, the block 48 shattered and the portion 49 shifted as molten aluminum material flowed therearound. Although it may seem to be somewhat surprising, motors utilizing field assemblies having fractured magnetic structures as depicted in FIGS. 5 and 6 do not appear to have the operating characteristics thereof degraded. Moreover, substantially identical motor performance may be obtained whether the ceramic magnets 42 have been magnetized prior to the aluminum casting process or after the aluminum casting process.

Turning now to FIG. 7, reference is made to the various fixture parts illustrated therein that may be used when practicing a new and improved process embodying the present invention. The parts shown in FIG. 7 are not all used simultaneously one with the other, but the relationships therebetween will be made clear from the following discussion.

In the lower left hand portion of FIG. 7, a stacking and aligning fixture 52 is illustrated. This fixture includes a plurality of pins 53, 54, 56, 57 that project upwardly from a base 58. Some of these pins are utilized for aligning pole pieces and yoke pieces that may be made from the laminations 39, 41 of FIGS. 3 and 4; and ceramic blocks 42 of FIG. 2. Other pins on the base 58 are useful for aligning other fixture parts in a manner explained hereinbelow.

Prior to stacking laminations on the fixture 52, a base plate 59 is positioned thereon, with the pins 54 projecting through slots 61, pins 57 projecting through holes 62, two pins 53, 56 projecting along slot 63, and two other pins 53, 56 projecting through holes 64, 66 respectively. An arbor block 67 is then positioned centrally on the base plate, its location being determined by cooperation of the eight pins 54 with tongue portions 68 of the arbor block. The pole faces, ceramic blocks, and yoke sections are then positioned about the arbor block, and thereafter a split outer cylinder 69 is positioned around the yoke pieces and clamped in place by driving a wedging clamp 71 along a pair of spaced apart tongues 72, 73 on the split cylinder. This action closes the cylinder and clamps it to the pieces that were previously stacked on the base plate 59.

Subsequently, the base plate 59, cylinder 69, and parts contained within the cylinder are removed from the aligning fixture 52 and positioned over an end plate 74. The base plate 59 is then slid from between the end plate 74 and cylinder 69; and cap 76 and screw clamp 77 are used to close the upper end of the cylinder 69. At this time, the screw clamp 77 is threaded into a threaded central aperture 87 in the end plate 74.

The end plate, arbor block, cylinder, etc. establish a casting fixture assembly 79 substantially as shown in FIGS. 19 and 20. This assembly, with the ceramic blocks and pole and yoke pieces contained therewithin, then is positioned in apparatus so that air may be evacuated from the interior of the fixture, and so that molten aluminum may be moved thereinto for the reasons discussed hereinabove.

FIGS. 9-18 are presented for the purpose of providing a sequential schematic presentation of sequential steps that may be followed while practicing one form of the invention. For purposes of clarity, parts that are shown with solid lines in one view may be shown in phantom in the next sequential view in order to emphasize the steps being discussed in that next sequential view. In addition, reference numerals of some parts have been omitted from some of the views where a discussion of a particular procedure in connection with such view would not require reference to such parts.

Figure 9:
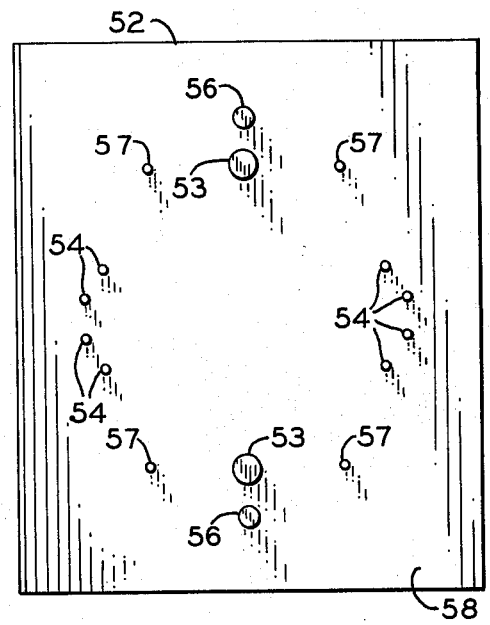
Figure 10:
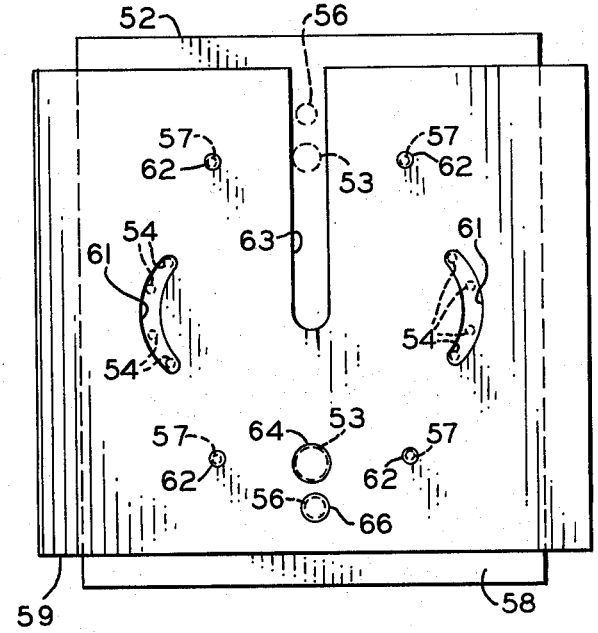
Figure 11:
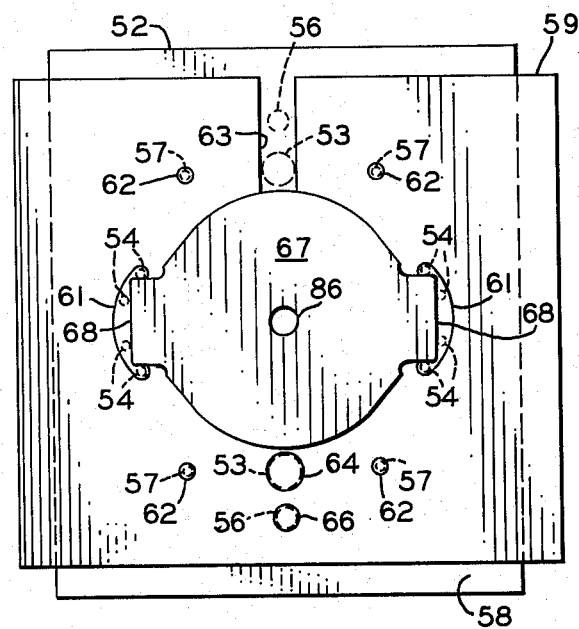
Figure 12:
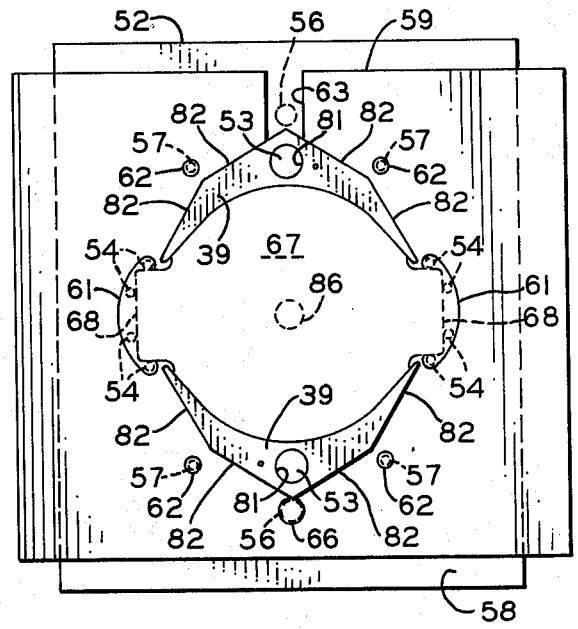

With reference now to FIG. 9, the aligning fixture 52 is shown prior to placing a base plate thereon. FIG. 10 illustrates an initial step where the base plate 59 has been positioned on top of the fixture 52, with the pins 53, 54, 56, 57 projecting upwardly through the holes 61-64 and 66 in the base plate. The arbor block 67 then is centrally positioned on the base plate with alignment pins 54 being used to assist in this step, all as shown in FIG. 11. Thereupon, (as better revealed in FIG. 12) the pole piece laminations 39 are positioned adjacent to the arbor block 67 between this block and locating pins 56, with pins 53 passing through the holes 81 in each lamination and thus assisting in aligning the pole pieces with arbor block 67.

Figure 13:
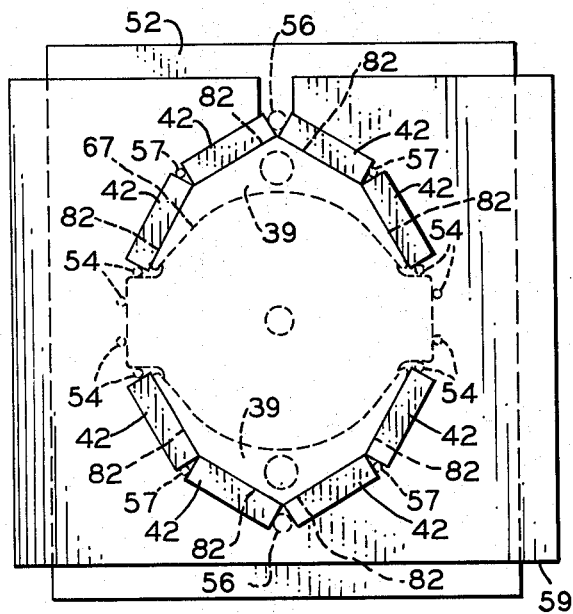

With reference now to FIG. 13, after the desired number of pole face laminations 39 have been stacked on the base plate 59 to establish pole faces of the desired axial length or height, selected ones of the pins 54, and pins 57 and 56 are used to assist in positioning a plurality of ceramic blocks 42 adjacent to flat faces 82 of the pole piece laminations.

Figure 14:
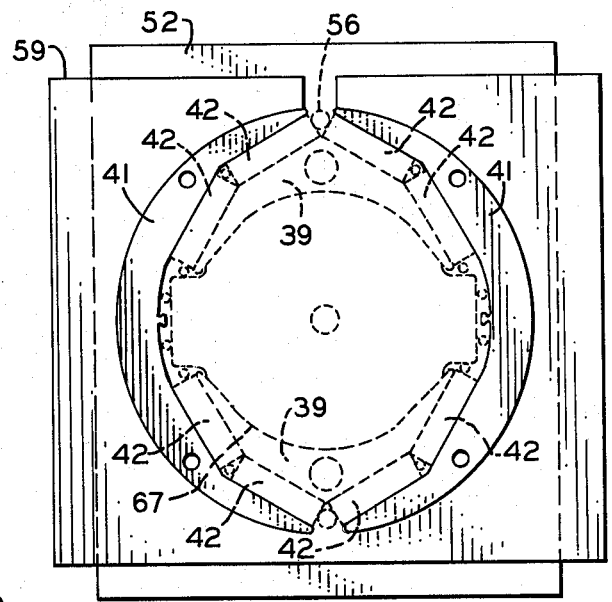
Figure 15:
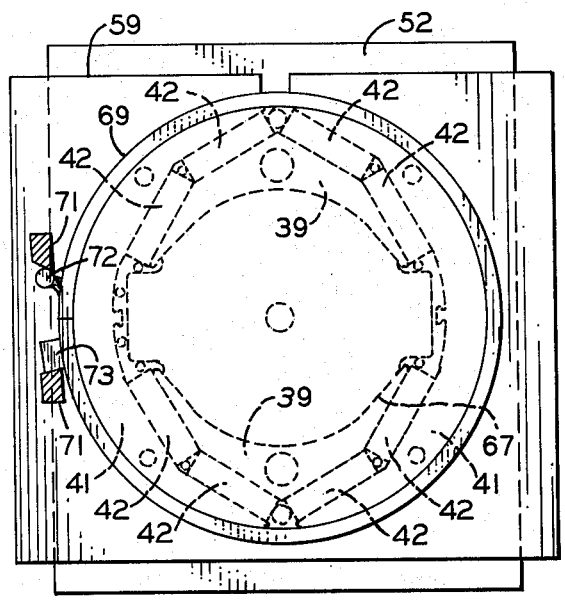

Subsequently, and as depicted by FIGS. 14 and 15, a plurality of yoke laminations 41 are positioned about the component parts that were previously positioned on the base plate 59; the split cylinder 69 is loosely positioned about the yoke pieces established by the yoke laminations 41, and the wedge clamp 71 is driven over the tongues 72, 73 to close the cylinder 69.

Figure 16:
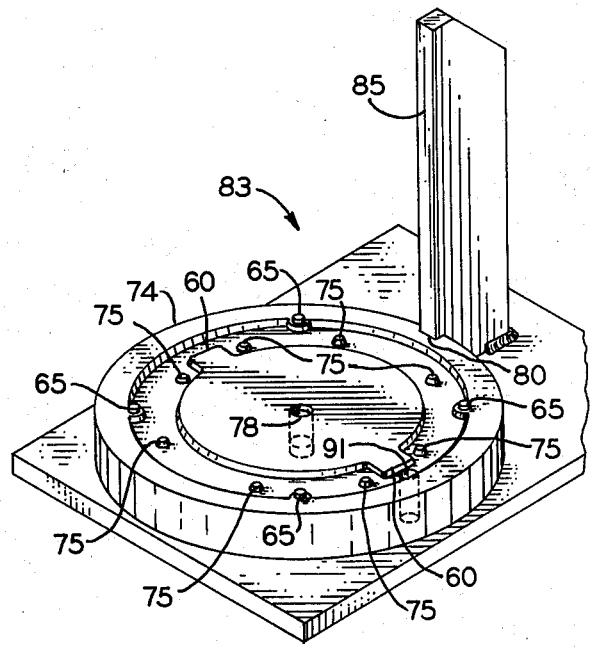
FIG. 16 is a perspective view of a molding fixture assembly station.

Thereafter, the base plate 59, cylinder 69, etc. are raised from the aligning fixture 52 and positioned on the end plate 74 that has previously been placed at an assembly station 83 as shown in FIG. 16. As the base plate and outer cylinder are positioned over the end plate 74, the base plate 59 is slid out from underneath the cylinder 69, as best revealed in FIG. 17; and the cylinder 69 is seated in the end plate 74.

The particular orientation of cylinder 69 per se relative to end plate 74 and relative to the ceramic blocks, pole pieces, and yoke pieces is not important. However, a predetermined alignment of arbor block 67, the pole pieces and magnets, etc. relative to end plate 74 is desirable since the end plate includes bosses 60 (see FIG. 7) that are, in effect, shaped and located to correspond to tongues 68 of arbor block 67. Similarly, not shown bosses on the underside of cap 76 are located and shaped to correspond to the tongues 68.

Projections 65 are provided on end plate 74 at locations to interfit with holes 70 in the yoke segment laminations 41 on the bottom of each stack. In addition, these projections prevent aluminum from entering the holes 70 and these holes may then later be used to accommodate clamp or through bolts that tie together end frames of a completed motor.

When the base plate 59 is removed in the direction of arrow A as indicated in FIG. 17, the cylinder 69 is manipulated to the extent necessary to permit seating of the aforementioned projections 65 in holes 70 of the lowermost laminations 41. In this manner, the desired alignment between the pole pieces, yoke pieces, arbor block, and end plate is established and maintained.

With reference again to FIGS. 7 and 16, it will be noted that end plate 74 also includes standoff pads 75 and an alignment notch 80. The lowermost pole piece, yoke piece, and ceramic block surfaces within the cylinder 69 rest on the pads 75 so that aluminum having a thickness at least equal to the height of the pads 75 will be formed on the bottom of the resultant cast field assembly.

The aforementioned slot 80 co-operates with an alignment bar 85 at the assembly station 83 (see FIG. 16); and the bar 85 in turn also co-operates with a notch 90 in the cap 76 (see FIG. 18) to ensure that the cap 76 is also assembled in the desired predetermined manner vis-a-vis the arbor block 67 and end plate 74.

It will be noted that the number of ceramic blocks used for each magnet is largely a matter of economic preference and that each magnet may be made from what originally is a single ceramic block, two ceramic blocks, etc.

The upper cap 76 and screw clamp 77 then are assembled with the cylinder 69 and end plate 74, with a portion of the screw clamp passing downwardly through a hole 84 in the cap 76 and a hole 86 in the arbor block 67. The threaded extremity of clamp screw 77 then is threaded into the end plate 74 to tightly clamp together the various fixture parts.

As best revealed in FIG. 20, the end plate 74 is provided with a threaded hole 87 and two alignment holes or recesses 88, 89 as well as a filling port 91 which communicates with the interior of the fixture assembly.

Following the above mentioned procedures, the entire fixture assembly 79 illustrated in FIGS. 19 and 20 is positioned on the lower table 92 of suitable apparatus such as machine 93 shown in FIG. 8. Bosses 94, 96 co-operate with the aforementioned alignment holes 88, 89, to ensure that the filling port 91 in end plate 74 is positioned over a filling aperture 97 which communicates with filling tube 99. After the casting fixture has been positioned on table 92 in this manner, the handle 101 of valve 102 is moved from a "lock" position (the position in which it is illustrated in FIG. 8), and a pair of palm buttons 103 are manually depressed whereupon fluid pressure is vented, through valve 104, from the front end of cylinder 106 to exhaust line 107. With pressure thus removed from cylinder 106, the weight of a steel bell jar 108 causes it to descend against a ring seal 109. The table 92 is provided with two grooves in which ring seals may be seated. The seal 109 is seated in one of these grooves and thus permits sealing of the bell jar 108 when the lip 111 thereof comes to rest upon the seal. However, when a larger bell jar is needed, the seal 109 may be removed and a larger seal placed in the groove 112 to sealingly engage the lip of such other, larger bell jar.

The jar 108 is connected to a conduit or pipe 113, and this conduit in turn is connected to a flexible conduit or hose 114. As bell jar 108 moves up or down, conduit 113 moves therewith. The jar 108 is suspended from the rod of cylinder 106, and the jar will move to and remain in the raised position shown in FIG. 8 when the handle 101 of valve 102 is moved to its position shown in FIG. 8.

A guide rod 116 is held in a vertical orientation between a lower clamp 117 and an aperture in frame part 118 through which the end of rod 116 passes. A not shown guide arm is attached to bell jar 108 and that arm slides along rod 116 and stabilizes the jar 108.

Once a casting fixture has been positioned with its filling port over opening 97, the jar 108 is lowered to its sealing position and thus seals the casting fixture therewithin. Thereafter, a ladle of molten aluminum is positioned at the end 98 of the filling tube 99 and raised so that the tube end 98 extends below the surface of the molten aluminum in the ladle. Thereupon, the foot pedal 119 is depressed to cause opening of a valve that interconnects the conduit 114 with a vacuum tank 121. The tank 121 is maintained in a substantially evacuated condition by a not shown exhaust pump, and when vacuum tank is interconnected via conduits 113, 114, and the not shown valve with the interior of bell jar 108, the air within the bell jar and casting fixture assembly is evacuated substantially immediately. Air escapes through cracks and crevices between the various parts of the casting fixture assembly, even though such cracks and crevices are not sufficiently large to permit the flashing of molten aluminum thereinto.

Figure 23:
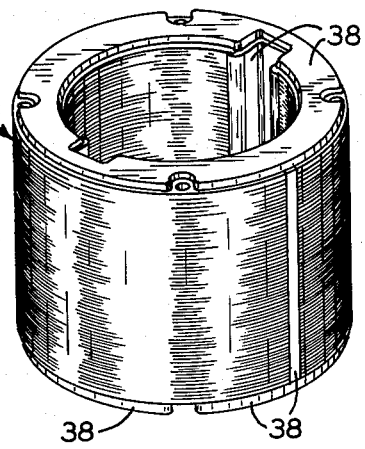
FIG. 23 is a perspective view of a field assembly after removal from the casting fixture.
Figure 24:
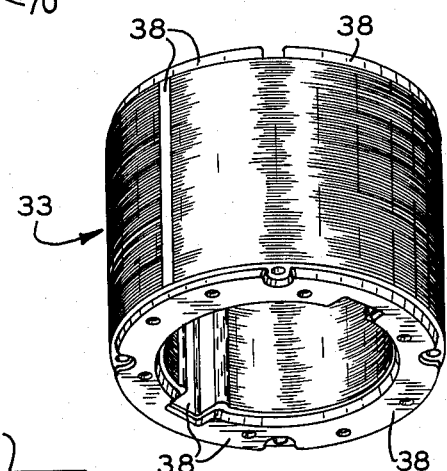
FIG. 24 is another perspective view of the field assembly shown in FIG. 23.

As the air is evacuated from within the casting fixture, atmospheric pressure on the surface of the ladle contained molten aluminum forces the aluminum upwardly through the filling tube 99 and into the interior of the casting fixture assembly. The casting fixture becomes filled with aluminum and the aluminum solidifies substantially immediately when the casting cavity is filled. The foot pedal 119 is then released, and excess aluminum contained within the ladle that has not moved into tube 99 is then returned to a molten aluminum storage vat or tank. Valve handle 101 then is moved to its position shown in FIG. 8, the not shown source of high pressure fluid (either hydraulic or pneumatic) is communicated from conduit 126 through valve 102 to the cylinder 106, and the bell jar raises to its upper position as shown in FIG. 8. The casting fixture, with a field assembly therein then is removed from the table 92. Subsequently, the fixture parts are disassembled, and a field assembly 33 as shown in FIGS. 23 and 24 is ready for further manufacturing treatment.

When extra long field assemblies are to be manufactured, it is possible that the molten aluminum might solidify before the casting cavity has been filled completely. To prevent this, it would then be desirable to provide an auxiliary heat source, such as the gas torch 105 of FIG. 8. The torch 105 may be connected to a not shown fuel supply and lighted to supply additional heat to the filler tube 99 and molten aluminum adjacent thereto during the casting process.

Figure 22:
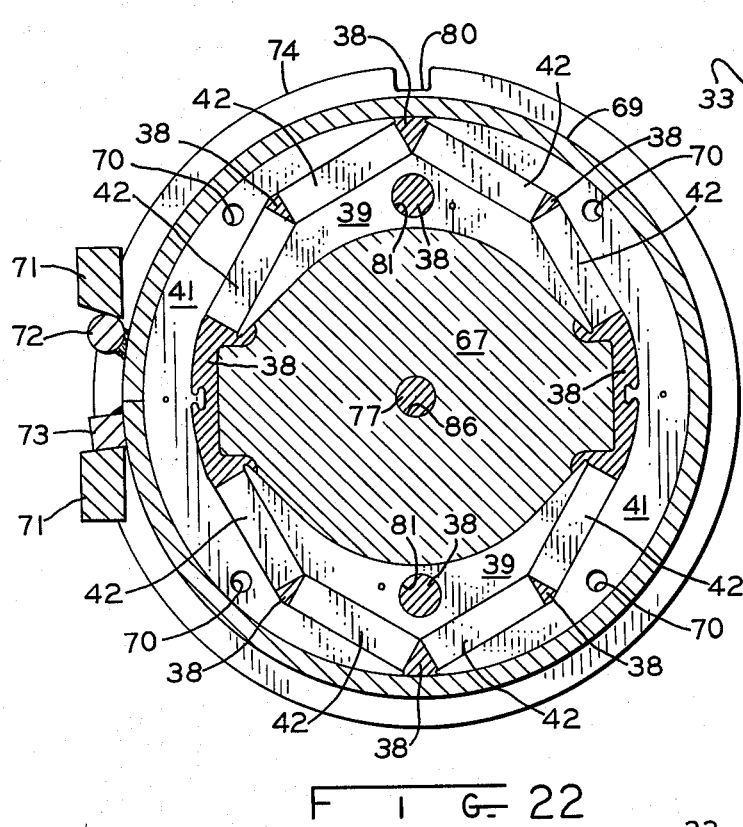
FIG. 22 is a view taken generally in the direction of lines 22—22 in FIG. 21, assuming that FIG. 21 was shown in full.
Figure 21:
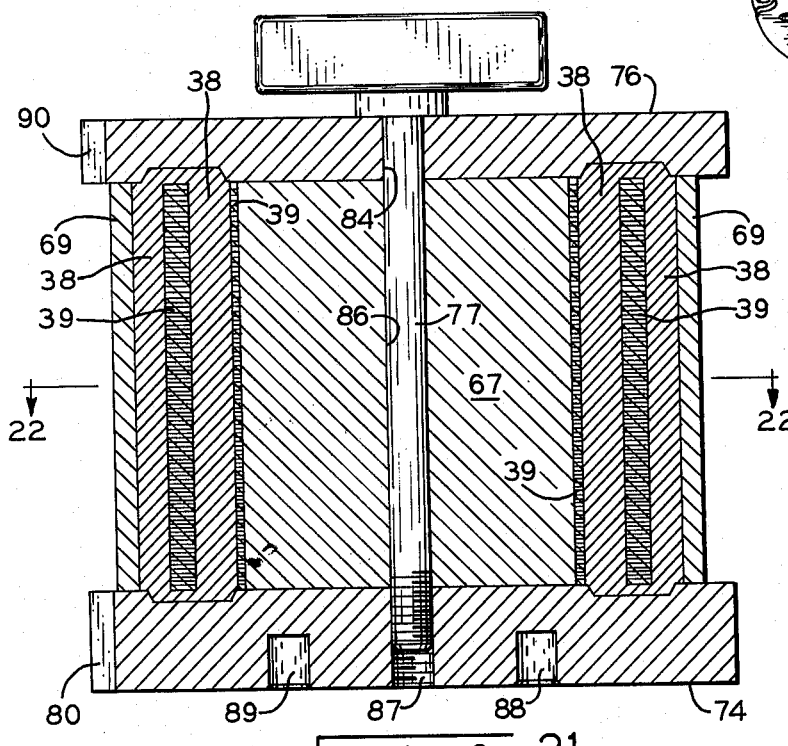
FIG. 21 is a view in cross section of the filled molding fixture of FIG. 20 after an aluminum casting procedure has been performed.

FIGS. 21 and 22 are views of the field assembly 33 as it would appear prior to disassembly of the casting fixture. It will be noted that aluminum matrix material 38 has substantially filled all of the cracks and crevices between the yoke pieces, pole pieces, and ceramic bars. Moreover, even though the ceramic bars fracture as the molten aluminum flows therepast, the aluminum solidifies sufficiently rapidly to retain the pieces of ceramic material in the regions where they originally were placed. The field assembly 33 as shown in FIGS. 23 and 24 may then have the surface or outer diameter thereof machined so that it can be accommodated with a press fit in an outer housing, such as the shell 32 shown in FIG. 1.

The stator assembly 31 will have brush mechanisms assembled therewith, and at any convenient time prior to positioning an armature therewithin, the field assembly will be positioned over conventional magnetizing apparatus so that the fragmented ceramic blocks entrapped within the aluminum matrix are magnetized. Alternatively, the ceramic blocks 42 may be magnetized prior to the assembly and casting process. We have found that the fracturing and cracking of ceramic magnet blocks 42 does not in and of itself detract from the magnetic properties of such blocks, whether they are magnetized prior to or after the above described casting procedures. Moreover, the exposure of magnetized ceramic blocks to the molten aluminum does not appear in any way to permanently degrade the magnetic characteristics of the ceramic blocks.

Final steps that permit utilization of the stator assembly 31 in a D.C. motor include positioning an armature within the bore of the field assembly, and securing end frames at the ends of the stator assembly so as to centrally position the armature within the bore of the stator. Conventional armatures, end frames, brush mechanisms, and connection members may be utilized for this purpose and, accordingly, such conventional structures are neither illustrated nor further described herein.

Figure 25:
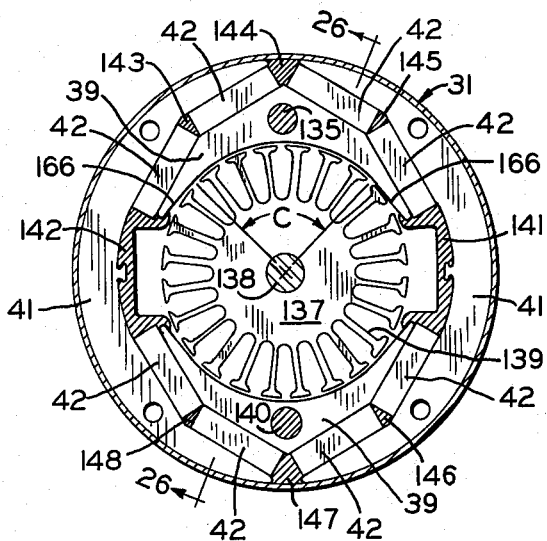
FIG. 25 is an end view, with parts removed and parts omitted, of a motor embodying one form of the invention.
Figure 26:
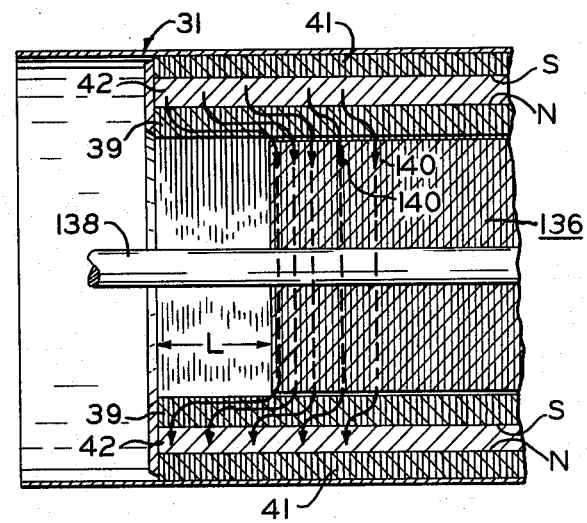
FIG. 26 is a view taken in the direction of arrows 26—26 in FIG. 25.
Figure 27:
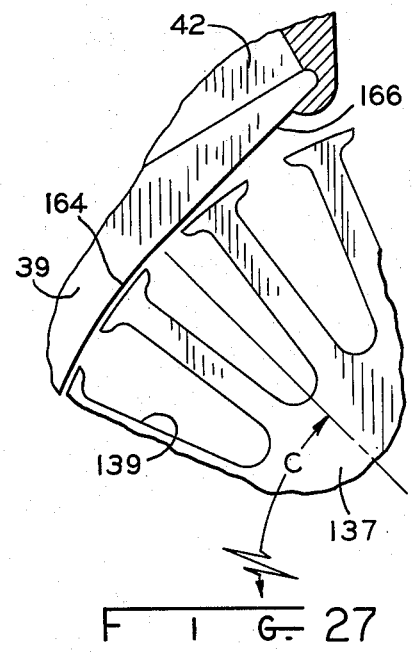
FIG. 27 is an enlargement of a portion of FIG. 25.

With reference now to FIGS. 25, 26, and 27, some of the particular advantages that may be obtained from structures constructed in preferred forms will now be described. In FIGS. 25-27, portions of the stator assembly 31 have been shown in detail in combination with parts of a conventional wound armature 136. The armature 136 is made up of a plurality of laminations 137, the configuration of which is best represented by FIGS. 25 and 27, a shaft 138, and a plurality of not shown conductors disposed axially along the slots 139 and interconnected in a conventional manner with a not shown conventional commutator. The armature conductors, commutator, and brush mechanism have been completely omitted from FIGS. 25 and 26 for ease of illustration. It will be recognized immediately from FIG. 26 that the magnets 42, stack of yoke laminations 41, and stacks of pole face laminations 39 have a greater axial length than the core made up of the stack of armature laminations. The ceramic material pieces 42 are represented in magnetized condition in FIGS. 25-27, and the north and south poles thereof are shown by the letters "N" and "S" in FIG. 26. By convention, lines of flux may be considered as emanating from the north pole of the FIG. 26 structure and entering the south pole thereof. Accordingly, lines 140 have been drawn to generally depict lines of magnetic flux that are directed from one side of the armature 136 to the opposite side thereof.

It will be noted that the stator stack of laminations 39, 42 substantially overhang the armature stack (at each end thereof) by an amount represented by the letter L in FIG. 26. Since a portion of the stator overhangs each end of the armature, the total amount of stator axial overhang would be 2L if the overhang is the same at each end of the stator. However, mechanical packaging considerations often will require a different amount of overhang at each end of the stator. For example, motors have been made with a stator stack of seven inches, an armature stack of four and a quarter inches wherein the overhang at the commutator end was three-quarters of an inch and the overhang at the other end was two inches. It has been known heretofore to utilize pole pieces for gathering and directing magnetic flux to an armature when the stator has overhung the armature. With the arrangement shown in FIGS. 25–27 it is emphasized that the face to face disposition of the pole piece laminations does not appreciably increase the reluctance to the gathered flux and thus does not materially detract from the amount of flux that would be collected from the overhanging portions of the stators if solid pole pieces were to be used.

In specific reductions to practice of the invention, motors having an armature stack of laminations measuring one and one-half inches have been centered within a stator stack having an axial length of two inches and also of three inches in motors rated at one-quarter horsepower. In one horse power rated motors, armature stacks of five inches have been centered in stators having stator stack dimensions of six inches and also in stator stack dimensions of seven inches. In all of these instances, magnetic flux has been collected and directed to the armature substantially as depicted by lines 140 in FIGS. 26.

A major advantage of the illustrated types of arrangements are that laminated structures can be utilized with no significant penalties in terms of flux collection in overhung stator designs. Processes embodying the invention as described hereinabove can be readily used to produce motors having varying or different amounts of stator to armature overhang and thus having, depending on the magnet material chosen for actual use, different amounts of flux, different amounts of protection against demagnetization, or combinations of the two.

More specifically, the stator stack length may be increased with a first given type of magnet being used so that the amount of flux will be increased. This can provide the useful advantage of decreasing the armature reactance and armature $I^2R$ losses with the result that motor life can be extended. Alternatively, magnet materials having greater coercive force may be used for a given stack length with the result that greater protection against demagnetization will be provided. If magnet materials of greater coercive force are used, stack height can then be increased to provide a total amount of flux that is at least approximately the same as the amount of flux that could have been provided by using a shorter stack height with magnets of lower coercive force. It should be apparent to persons skilled in the art that the ability to very readily change stator length (and thus magnet length) provides a greater amount of flexibility in choosing different magnet materials for optimizing resistance to degausing and amount of total flux desired.

For applications where maximum resistance to degausing is required (for example for those applications where the motor will be subjected to plug reversal), a magnet material having a maximum coercive force characteristic will be chosen even though such material will inherently have less residual flux characteristics. Then, in order to increase the amount of armature flux, the amount of overhang may be increased.

By utilizing laminations for the pole pieces, for overhanging stator applications, it is extremely easy to establish small incremental differences in the amounts of overhang simply by changing the height of the lamination stack.

It should now be appreciated that motors constructed as taught herein will have substantially increased mechanical reliability and yet may also be constructed very economically to have the desired combination of flux collection characteristics and ability to withstand degausing due to armature reaction.

The motor represented by FIGS. 25–27 are also characterized by good stability of the main field magnetic flux. It will be understood by persons skilled in the art that the magnets of the stator assembly 31 tend to establish a constant field of main flux. However, due to armature reaction, the main field flux actually tends to pulsate during motor operation. The amount of magnitude of such fluctuation is greatly reduced in motors produced according to the present invention because of an amortisseur winding effect provided by portions of the aluminum matrix. For example, flux due to armature reaction (that would tend to cause a pulsation of the main field flux) induces currents in the matrix segments 135, 140, 141, 142, 143, 144, 145, 146, 147, and 148 (best seen in FIG. 28). Each of these elements are interconnected at the ends thereof by ring segments 149, 151 and, thus, the aluminum matrix 38 establishes a short circuited squirrel cage arrangement. The fields associated with the armature reaction induced currents in the axially extending elements 135 and 140-148 are such that they tend to stabilize the main field flux. Thus, amortisseur or damper winding effects are provided by the same means that establish mechanical reliability of our motors and that also are effective for maintaining the repeatability of our preferred production process.

Commutation improvement is also provided by utilizing a tapered air gap that is best illustrated in FIG. 27. With reference to FIG. 27 and FIG. 26, it will be appreciated that a central portion 164 of the laminated pole face is concentric with the armature, the portion 164 having an angular span C chosen to be approximately 90°. However, the ends of each pole are tapered as shown at 166. It thus should be appreciated that a tapered air gap may now be provided in relatively inexpensive d-c motors whereas tapered air gaps previously have been associated with more expensive permanent magnet motor constructions.

Figure 30:
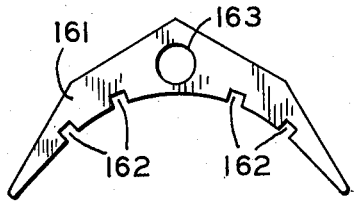
FIG. 30 is a view of a modified pole piece lamination that may be used to establish different motor characteristics.

Others motors constructed according to the invention were provided with superior transient compensation which would be of primary importance, for example, in servo applications. Superior transient compensation may be accomplished by utilizing pole face laminations such as the pole face lamination 161 (shown in FIG. 30) in lieu of the pole face lamination 39 (of FIG. 4). The pole face lamination 161 is substantially identical to the pole face lamination 39 with the exception that four slots 162 are shown along the face thereof.

Figure 28:
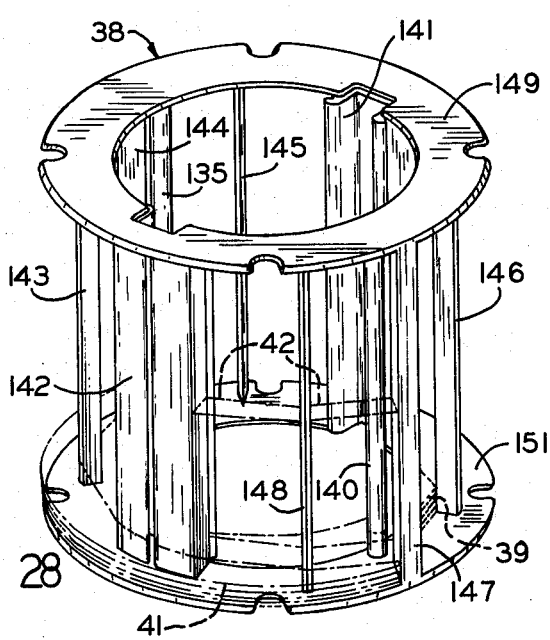
FIG. 28 is a view of the aluminum matrix portion of the structure shown in FIGS. 25 and 26.

When the lamination 161 is utiized, the slots 162 (as well as the slot 163 of course) are filled with part of the aluminum matrix that extends between the short circuiting end rings (such as the end rings 149, 151 in FIG. 28).

Other motor construction details are presented in our U.S. Pat. Nos. 3,465,186; and 3,590,293 and the disclosures of both of these patents are incorporated herein by reference.

Figure 29:
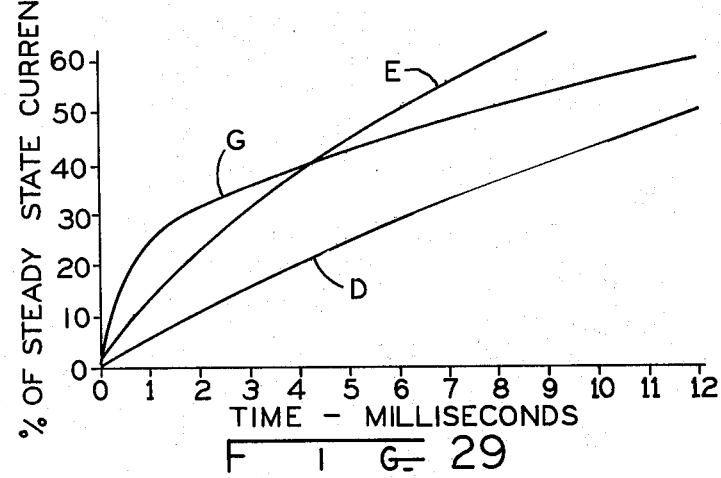
FIG. 29 is a plot of locked rotor armature current versus time for different motor designs.

FIG. 29 is a plot of instantaneous current expressed as a percent of steady state armature current (for a locked rotor condition) versus milliseconds for a constant steady state d-c voltage. For the purpose of this disclosure, "electrical time constant" is defined, for a permanent magnet d-c motor, to be the time (in milliseconds) that it takes for the armature current (under locked rotor conditions) to reach 63.2% of its steady state value.

Turning now to FIG. 29, curve D represents a plot of locked rotor armature current vs. time for a motor, constructed by practicing our invention and using pole face laminations as shown at 39 in FIG. 4, energized by a step direct current voltage source. Curve E is a corresponding plot for an arch-segment type of prior art motor (wherein the permanent magnets themselves established one side of the working air gap); and curve G is a corresponding plot for a motor constructed pursuant to our invention and having pole face laminations substantially as shown at 161 in FIG. 30.

By comparing curves D, E, and G, it will be noted that the time constant (as defined above) for the "prior art" motor was shorter than that of the other two motors. However, the actual average torque response of the curve "G" motor was actually the best of all three motors on rectified 60 Hz power.

Thus, as compared to the referred to "prior art" motor approach, the present invention may be utilized to provide motors having a very good response characteristic for servo applications; or to provide motors having a longer, more desirable time constant for continuous operation applications. It will be understood that a longer time constant is desirable for non-servo applications in order to improve the form factor (and thus reduce armature losses) and to reduce torque pulsations when running on rectified power.

It should now be apparent that our invention would permit persons skilled in the art to produce, with little effort and little differential expense, different motors having a wide range of characteristics. For example, transient compensation (and thus changes in electrical time constant) may be readily modified by using different pole face laminations (e.g., lamination 39 or lamination 161); total flux for desired amounts of resistance to degausing may be modified by providing different amounts of stator overhang; and commutation may be assisted by using pole face laminations that will establish desired amounts of air gap taper. More importantly, these features can all now be provided with a reliably repeatable manufacturing process that produces mechanically reliable motors having stabilized main field flux characteristics.

Reference has been made herein to "ceramic" material or "ceramic" magnets to distinguish brittle and easily damaged permanently magnetizable materials from more durable materials such as alloys of steel (e.g., "Alnico"). In the art however, ferrite magnetic materials are commonly referred to as "ceramic", whereas other brittle materials, such as samarium-cobalt magnets are not commonly referred to as "ceramic". The present invention of course is usable with ferrite ceramic materials or other permanently magnetizable materials, including samarium-cobalt, that would crack or fracture when subjected to thermal shocks of the magnitude contemplated herein. Accordingly, in view of the absence of an art recognized generic term for both ferrite ceramic and other easily fractured materials such as, for example, samarium-cobalt; the terms "ceramic magnet material" are used consistently throughout this application (including the claims hereof) as being a generic term that is descriptive of non-Alnico type permanently magnetizable materials, including samarium cobalt and ferrite. It now also is noted that "d-c" motors, as referred to herein is meant to be inclusive of motors designed to operate from a direct current power source as well as a rectified alternating current power source.

Although we have described above and illustrated preferred exemplifications of our invention, it will be understood that the invention itself may be modified while still making use thereof.

Accordingly, while in accordance with the Patent Statutes we have described what at present are considered to be preferred embodiments of the invention, it will be obvious to those skilled in the art that numerous changes and modifications may be made therein without departing from the invention.

We claim:

1. A method of making a d-c motor field assembly comprising a plurality of pole pieces, yoke sections, and ceramic magnet material members, the method comprising the steps of: arranging at least two loose pole pieces, at least two loose yoke pieces, and at least two loose ceramic magnet material members so that each loose ceramic magnet material member is sandwiched between a yoke piece and a pole piece but not secured thereto; holding the at least two loose pole pieces, at least two loose yoke pieces, and at least two loose ceramic magnet material members in the sandwiched but not secured relationship within a casting cavity defined by at least two cavity establishing components so that some of the peripheral surfaces of the loose magnetic material members are bounded by the respective loose pole pieces and yoke pieces; evacuating air from the casting cavity, and admitting heated molten material into the cavity around the loose ceramic magnet material members, loose pole pieces, and loose yoke pieces and bounding the remaining portions of the peripheral surfaces of the loose magnet material members with the molten material even though the thermal shock to the magnet material members causes fracturing of the magnet material members; solidifying the heated molten material along the ceramic magnet material, yoke pieces, and pole pieces, and thereby establishing a solid matrix that holds the ceramic magnet material, pole pieces, and yoke pieces together as a d-c motor field assembly, with the ceramic magnet material constrained to remain sandwiched between pole and yoke pieces by the solid matrix.

2. The method of claim 1 wherein the molten material is molten aluminum having a temperature of at least about 660° C, and the method includes heating aluminum to at least about 660° C and thereafter admitting the heated molten aluminum into the cavity.

3. The method of claim 1 further including: supporting the casting cavity within an evacuation chamber while a filling port for the cavity is disposed in open communication with an opening of a filling tube; blocking a second opening of the filling tube with heated molten material; and thereafter evacuating air from the casting cavity and thereby causing heated molten material to flow through the filling tube through the filling port, and into the cavity.

4. The method of claim 3 further comprising: applying heat to the filling tube while the second opening of the filling tube is being blocked with the molten material.

5. The method of claim 1 wherein: arranging the loose pole pieces, loose yoke pieces, and loose ceramic magnet material members includes positioning the loose pole pieces adjacent to a bore establishing member, positioning the loose ceramic magnet material members adjacent to the loose pole pieces, and positioning the loose yoke pieces adjacent to the loose ceramic magnet material members.

6. The method of claim 5 wherein: positioning the loose pole pieces includes placing a plurality of loose pole piece lamina adjacent to the bore establishing members; positioning the loose yoke pieces includes placing a plurality of loose yoke lamina adjacent to the ceramic magnet material pieces; and the method further includes placing a cylindrical fixture about the loose yoke lamina.

7. A method of making a d-c motor field assemby comprising a plurality of pole pieces, yoke pieces, and ceramic magnet material members, the method comprising the steps of: arranging at least two loose pole pieces, at least two loose yoke pieces and at least two loose ceramic magnet material members so that each loose ceramic magnet material member is sandwiched between a loose yoke piece and a loose pole piece; holding the at least two loose pole pieces, at least two loose yoke pieces, and at least two loose ceramic magnet material members in the sandwiched relationship within a casting cavity defined by at least two components; fracturing the magnet material members by flowing heated molten material in the cavity and along the ceramic magnet material members and thereby subjecting the magnet material members to thermal shock; solidfying the heated molten material along the ceramic magnet material and thereby establishing a solid matrix that holds fractured ceramic magnet material pieces in place between pole and yoke pieces.

8. The method of claim 7 wherein the molten material is molten aluminum having a temperature of at least about 660° C, and the method includes heating aluminum to at least about 660° C and thereafter admitting the heated molten aluminum into the cavity.

9. A d-c motor field assembly produced by the process of claim 7.

10. A d-c motor field assembly produced by the process of claim 8.

11. A method of making a d-c motor field assembly comprising a plurality of pole pieces, at least one yoke section, and a plurality of magnet material members, the method comprising the steps of: arranging at least two loose pole pieces, at least one loose yoke section and at least two loose magnet material members so that each loose magnet material member is sandwiched between a yoke section and a pole piece; holding the at least two loose pole pieces, at least one loose yoke section, and at least two loose magnet material members in the sandwiched relationship within a casting cavity defined by at least two components; fracturing the loose magnet material members by flowing heated molten material in the cavity and along the loose magnet material members, and thereby subjecting the magnet material members to thermal shock; and solidifying the heated molten material along the magnet material and thereby establishing a solid matrix that holds fractured magnet material pieces in place between the at least one yoke section and pole pieces.

12. The method of claim 11 wherein arranging the loose pole pieces includes selecting loose pole pieces having a configuration preselected for providing a predetermined d-c motor electrical time constant.

13. The method of claim 11 wherein arranging the loose pole pieces includes selecting loose pole pieces having a configuration preselected for establishing a bore having at least two spaced apart regions generally concentric with a cylindrical section and at least two spaced apart regions that are nonconcentric with the same cylindrical section.

14. A method of making a d-c motor field assembly comprising a plurality of pole pieces, at least one yoke section, and magnet material members, the method comprising the steps of: arranging at least two loose pole pieces, at least one loose yoke section, and at least two loose magnet material members so that each loose magnet material member is sandwiched between a yoke piece and a pole piece but not secured thereto; holding the at least two loose pole pieces, at least one loose yoke section, and at least two loose magnet material members in the sandwiched but not secured relationship within a casting cavity defined by at least two cavity establishing components so that some of the peripheral surfaces of the loose magnetic material members are bounded by the respective loose pole pieces and yoke section; admitting heated molten electrically conductive material to establish a closed circuit electrically conductive cage around the loose magnet material members, loose pole pieces, and yoke section bounding the remaining portions of the peripheral surfaces of the loose magnet material members with the molten material; solidifying the heated molten material along the magnet material, pole pieces and yoke section and thereby establishing a solidified matrix of electrically conductive material that holds the magnet material, pole pieces, and at least one yoke section together as a d-c motor field assembly and that also establishes amortisseur winding means for the motor field assembly.

15. A method of making a d-c motor field assembly comprising a plurality of pole pieces, at least one yoke section, and magnet material members, the method comprising the steps of: arranging at least two pole pieces, the at least one yoke section and at least two magnet material members so that each magnet material member is sandwiched between a yoke section and a pole piece; holding the at least two pole pieces, at least one yoke section, and at least two magnet material members in the sandwiched relationship within a casting cavity defined by at least two components; fracturing the magnet material members by flowing electrically conductive heated molten material in the cavity and along the magnet material members and thereby subjecting the magnet material members to thermal shock; solidifying the heated molten material along the ceramic magnet material and thereby establishing amortisseur winding means as part of a solidified matrix that holds fractured magnet material pieces in place between the at least one yoke section and pole pieces.

* * * * *